(12) United States Patent
Mahmood

(10) Patent No.: US 10,205,760 B2
(45) Date of Patent: Feb. 12, 2019

(54) TASK COORDINATION IN DISTRIBUTED SYSTEMS

(71) Applicant: Citrix Systems, Inc., Fort Lauderdale, FL (US)

(72) Inventor: Aftab Mahmood, Pleasanton, CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 201 days.

(21) Appl. No.: 14/703,074

(22) Filed: May 4, 2015

(65) Prior Publication Data

US 2015/0319226 A1 Nov. 5, 2015

Related U.S. Application Data

(60) Provisional application No. 61/988,493, filed on May 5, 2014.

(51) Int. Cl.
*H04L 29/06* (2006.01)
*H04L 12/26* (2006.01)
(Continued)

(52) U.S. Cl.
CPC ...... *H04L 65/4076* (2013.01); *H04L 41/0893* (2013.01); *H04L 43/0817* (2013.01);
(Continued)

(58) Field of Classification Search
CPC ..... H04L 67/42; H04L 41/5003; H04L 43/08; G06F 15/16
(Continued)

(56) References Cited

U.S. PATENT DOCUMENTS 6,636,922 B1 * 10/2003 Bastiani .............. G06F 13/4291
709/250
7,783,931 B2 * 8/2010 Coronado ............. G06F 11/201
714/43
(Continued)

FOREIGN PATENT DOCUMENTS

EP 2683185 A1 1/2014
WO 0156234 A1 8/2001

OTHER PUBLICATIONS

Sep. 3, 2015 (WO) International Search Report and Written Opinion—App. PCT/US2015/029193.
(Continued)

*Primary Examiner* — Tesfay Yohannes
(74) *Attorney, Agent, or Firm* — Banner & Witcoff, Ltd.

(57) ABSTRACT

Methods and systems are disclosed for providing approaches to enhanced task coordination in distributed systems. The methods and systems may include receiving, by a first computing device, a command for a client device and determining whether the first computing is connected to the client device. The methods and systems may include that if the first computing device is not connected to the client device, then transmitting, from the first computing device, a first message to a database associated with the cluster, the first message including the command and a device state of the first computing device, transmitting, from the database, a second message to a second computing device of the cluster, the second message including the command and the device state of the first computing device, and transmitting, from the second computing device and based on the device state of the second computing device, the command to the client device.

20 Claims, 11 Drawing Sheets

(51) Int. Cl.
  *H04L 12/24* (2006.01)
  *H04L 29/08* (2006.01)
(52) U.S. Cl.
  CPC .............. *H04L 43/10* (2013.01); *H04L 67/10* (2013.01); *H04L 67/42* (2013.01)
(58) Field of Classification Search
  USPC .......................................... 709/201; 719/313
  See application file for complete search history.

(56) References Cited

U.S. PATENT DOCUMENTS

| | | | | |
|---|---|---|---|---|
| 8,140,612 | B2* | 3/2012 | Tannenbaum | G06F 9/5072 709/201 |
| 8,189,500 | B2* | 5/2012 | Hayashi | H04W 48/16 370/310 |
| 8,622,840 | B2* | 1/2014 | Suzuki | A63F 13/12 463/30 |
| 8,751,711 | B2* | 6/2014 | Anantha Padmanaban | G06F 13/10 710/15 |
| 8,773,992 | B2* | 7/2014 | Lai | H04L 45/04 370/230.1 |
| 8,959,323 | B2* | 2/2015 | Ganti | G06F 9/4401 713/2 |
| 9,009,196 | B2* | 4/2015 | Ram | G06F 17/30578 707/636 |
| 9,038,091 | B2* | 5/2015 | Jonnagadla | G06F 9/546 719/310 |
| 9,400,605 | B2* | 7/2016 | Haustein | G06F 3/0614 |
| 9,413,837 | B2* | 8/2016 | Vaccari | H04W 4/029 |
| 9,497,106 | B2* | 11/2016 | Khanal | H04L 45/021 |
| 2005/0021721 | A1* | 1/2005 | Takahashi | H04N 1/00204 709/223 |
| 2007/0109561 | A1* | 5/2007 | Suzue | H04N 1/00408 358/1.1 |
| 2008/0077975 | A1* | 3/2008 | Sugauchi | G06F 21/31 726/4 |
| 2010/0185951 | A1* | 7/2010 | Nichols | H04L 65/4015 715/738 |
| 2012/0239830 | A1* | 9/2012 | Sugimura | G06F 3/14 710/29 |
| 2012/0303763 | A1* | 11/2012 | Duggal | G06Q 10/10 709/219 |
| 2012/0327309 | A1* | 12/2012 | Ikeda | H04N 5/4403 348/734 |
| 2015/0308707 | A1* | 10/2015 | Tanaka | F24F 11/0086 700/276 |
| 2015/0310227 | A1* | 10/2015 | Ishida | G06F 21/31 726/28 |
| 2015/0316281 | A1* | 11/2015 | Yabuta | F24F 1/32 700/276 |

OTHER PUBLICATIONS

"BEA MessageQ Release 5.0," The BEA Documentation Source, Apr. 25, 2000, retrieved from http://docs.oracle.com/cd/E13203_01/tuxedo/msgq/index.htm.

* cited by examiner

FIG. 8

| NODE_ROSTER | 800 |
|---|---|
| 🔑 ID | INTEGER |
| NODE_NAME | CHARACTER VARYING(255) |
| NEXT_CHECKIN | TIMESTAMP WITHOUT TIME ZONE |
| HEARTBEAT_RATE | INTEGER |
| STATUS | CHARACTER VARYING(16) |
| ROLE | CHARACTER VARYING(64) |
| JSON_STORE | TEXT |
| CREATION_DATE | TIMESTAMP WITHOUT TIME ZONE |
| LAST_MODIFIED | TIMESTAMP WITHOUT TIME ZONE |

FIG. 9

| NODE_TASK | 900 |
|---|---|
| 🔑 ID | INTEGER |
| TASK_NAME | CHARACTER VARYING(255) |
| SINGLETON | BOOLEAN |
| BATCH_SIZE | INTEGER |
| FREQUENCY | INTEGER |
| FREQUENCY_UNIT | CHARACTER VARYING(12) |
| RESTRICTIONS | TEXT |
| TTL | INTEGER |
| LAST_MODIFIED | TIMESTAMP WITHOUT TIME ZONE |

FIG. 10

| NODE_TASK_ROSTER | 1000 |
|---|---|
| 🔑 ID | INTEGER |
| TASK_NAME | CHARACTER VARYING(255) |
| SERVICING_NODE | CHARACTER VARYING(255) |
| DATA_SET | TEXT |
| NODE_ROLE | CHARACTER VARYING(64) |
| STATUS | CHARACTER VARYING(16) |
| NEXT_RUN | TIMESTAMP WITHOUT TIME ZONE |
| NOT_BEFORE | TIMESTAMP WITHOUT TIME ZONE |
| GROUP_ID | INTEGER |
| SEQUENCE | INTEGER |
| LAST_MODIFIED | TIMESTAMP WITHOUT TIME ZONE |

FIG. 13

| NODE_MESSAGE | 1300 |
|---|---|
| ID | INTEGER |
| FROM | CHARACTER VARYING(255) |
| TO | CHARACTER VARYING(255) |
| TOPIC | CHARACTER VARYING(255) |
| TOPIC_GROUP | CHARACTER VARYING(255) |
| REFERENCE | CHARACTER VARYING(64) |
| REF_TYPE | CHARACTER VARYING(32) |
| PAYLOAD | TEXT |
| RESTRICTIONS | TEXT |
| PRIORITY | CHARACTER VARYING(8) |
| STATUS | CHARACTER VARYING(16) |
| HOP_COUNT | SMALLINT |
| CORRELATION_ID | CHARACTER VARYING(64) |
| CREATION_DATE | TIMESTAMP WITHOUT TIME ZONE |

FIG. 14

| NODE_DEVICE_ROSTER | 1400 |
|---|---|
| ID | INTEGER |
| DEVICE_ID | CHARACTER VARYING(64) |
| NODE_NAME | CHARACTER VARYING(255) |
| LAST_MODIFIED | TIMESTAMP WITHOUT TIME ZONE |

TASK COORDINATION IN DISTRIBUTED SYSTEMS

PRIORITY

The present application claims priority to U.S. Provisional Application No. 61/988,493, entitled "Task Coordination and State Replication in Distributed Systems," filed May 5, 2014, which is incorporated herein by reference in its entirety.

FIELD

Aspects of the disclosure generally relate to computing hardware and computer software. In particular, one or more aspects of the disclosure relate to computing hardware and computer software for providing enhanced coordination in distributed systems.

BACKGROUND

Distributed systems are becoming increasingly popular. More and more people and businesses are using distributed systems for a variety of purposes. These entities may wish to provide enhanced coordination among the various nodes of the distributed systems to increase efficiency and speed. Thus, there is a need to manage a distributed system in ways that increase coordination among the different components of the distributed system.

SUMMARY

As a general introduction to the subject matter described in more detail below, aspects described herein are directed to managing computing devices for enhanced task coordination in distributed systems.

One or more aspects of the disclosure provide for a method that may include receiving, by a first computing device of a cluster of computing devices, a command for a client device and determining whether the first computing device of the cluster is connected to the client device. The method may include that if the first computing device is not connected to the client device, then transmitting, from the first computing device, a first message to a database associated with the cluster, the first message including the command and a device state of the first computing device; transmitting, from the database, a second message to a second computing device of the cluster, the second message including the command and the device state of the first computing device; and transmitting, from the second computing device and based on the device state of the second computing device, the command to the client device. The method may include that if the first computing device is connected to the client device, then transmitting the command from the first computing device to the client device.

One or more aspects of the disclosure provide for a system that includes at least one processor; and at least one memory storing instructions that, when executed by the at least one processor, cause the system to perform one or more steps. The steps the system may perform may include receiving, by a first computing device of a cluster of computing devices, a command for a client device and determining whether the first computing device of the cluster is connected to the client device. The steps may include that if the first computing device is not connected to the client device, then transmitting, from the first computing device, a first message to a database associated with the cluster, the first message including the command and a device state of the first computing device; transmitting, from the database, a second message to a second computing device of the cluster, the second message including the command and the device state of the first computing device; and transmitting, from the second computing device and based on the device state of the second computing device, the command to the client device. The steps may include that if the first computing device is connected to the client device, then transmitting the command from the first computing device to the client device.

One or more aspects of the disclosure provide for one or more non-transitory computer-readable storage media having instructions stored thereon, that when executed by one or more processors, may cause the one or more processors to perform steps. The steps that the one or more processors perform may include receiving, by a first computing device of a cluster of computing devices, a command for a client device and determining whether the first computing device of the cluster is connected to the client device. The steps may include that if the first computing device is not connected to the client device, then transmitting, from the first computing device, a first message to a database associated with the cluster, the first message including the command and a device state of the first computing device; transmitting, from the database, a second message to a second computing device of the cluster, the second message including the command and the device state of the first computing device; and transmitting, from the second computing device and based on the device state of the second computing device, the command to the client device. The steps may include that if the first computing device is connected to the client device, then transmitting the command from the first computing device to the client device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIG. 8 depicts an illustrative data diagram in accordance with one or more features described herein.

FIG. 9 depicts an illustrative data diagram in accordance with one or more features described herein.

FIG. 10 depicts an illustrative data diagram in accordance with one or more features described herein.

FIG. 13 depicts an illustrative data diagram in accordance with one or more features described herein.

FIG. 14 depicts an illustrative data diagram in accordance with one or more features described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
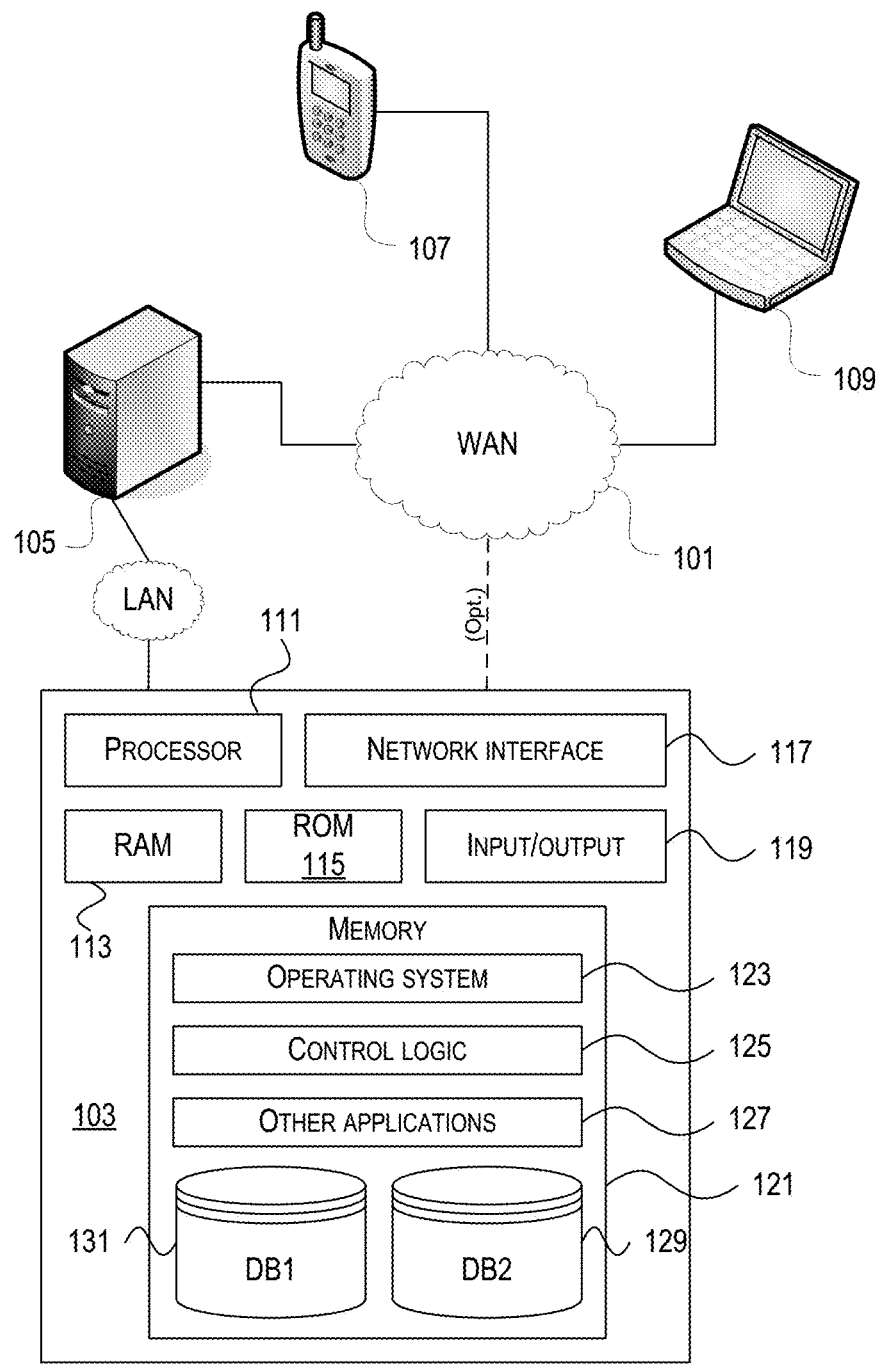
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
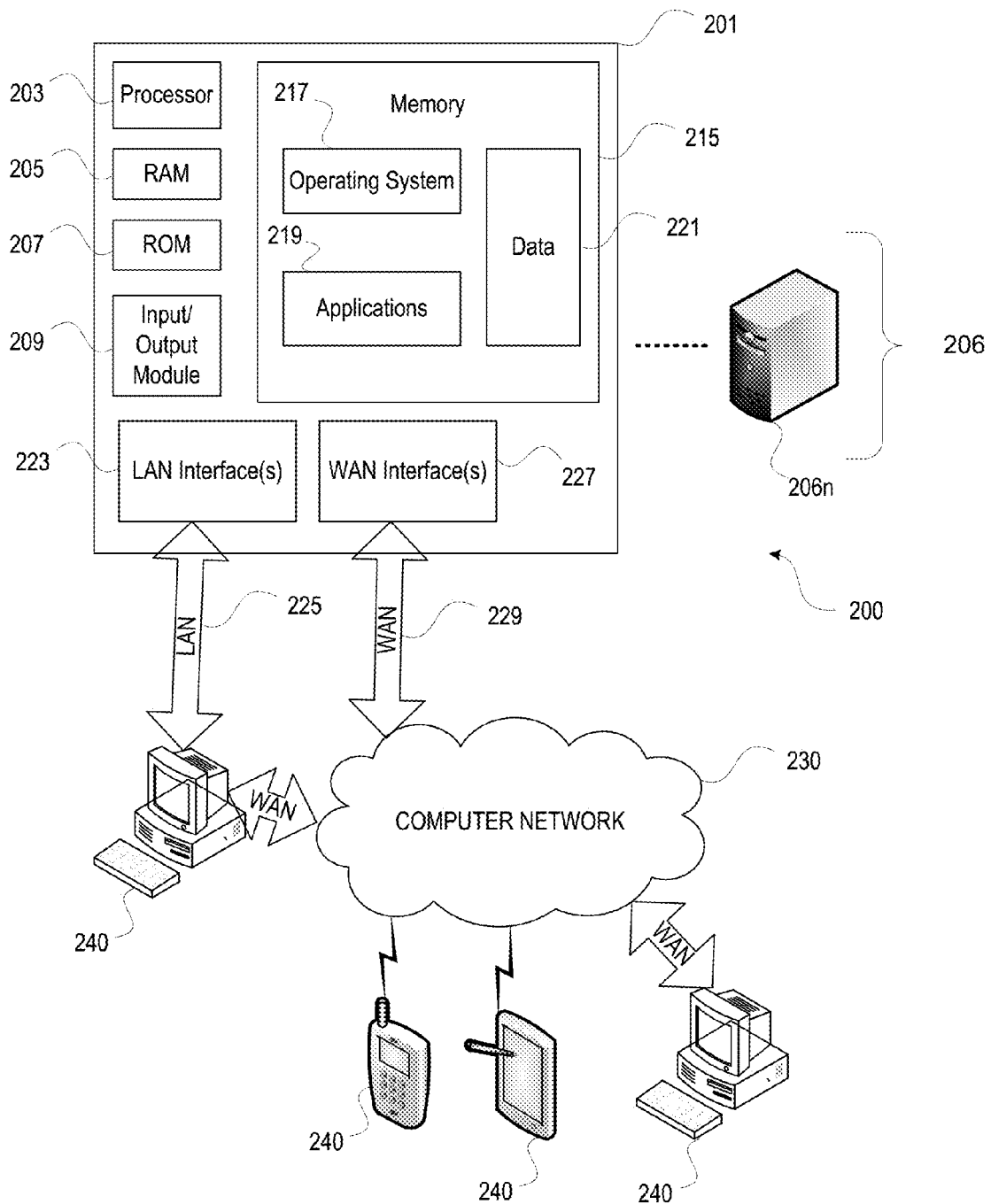
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
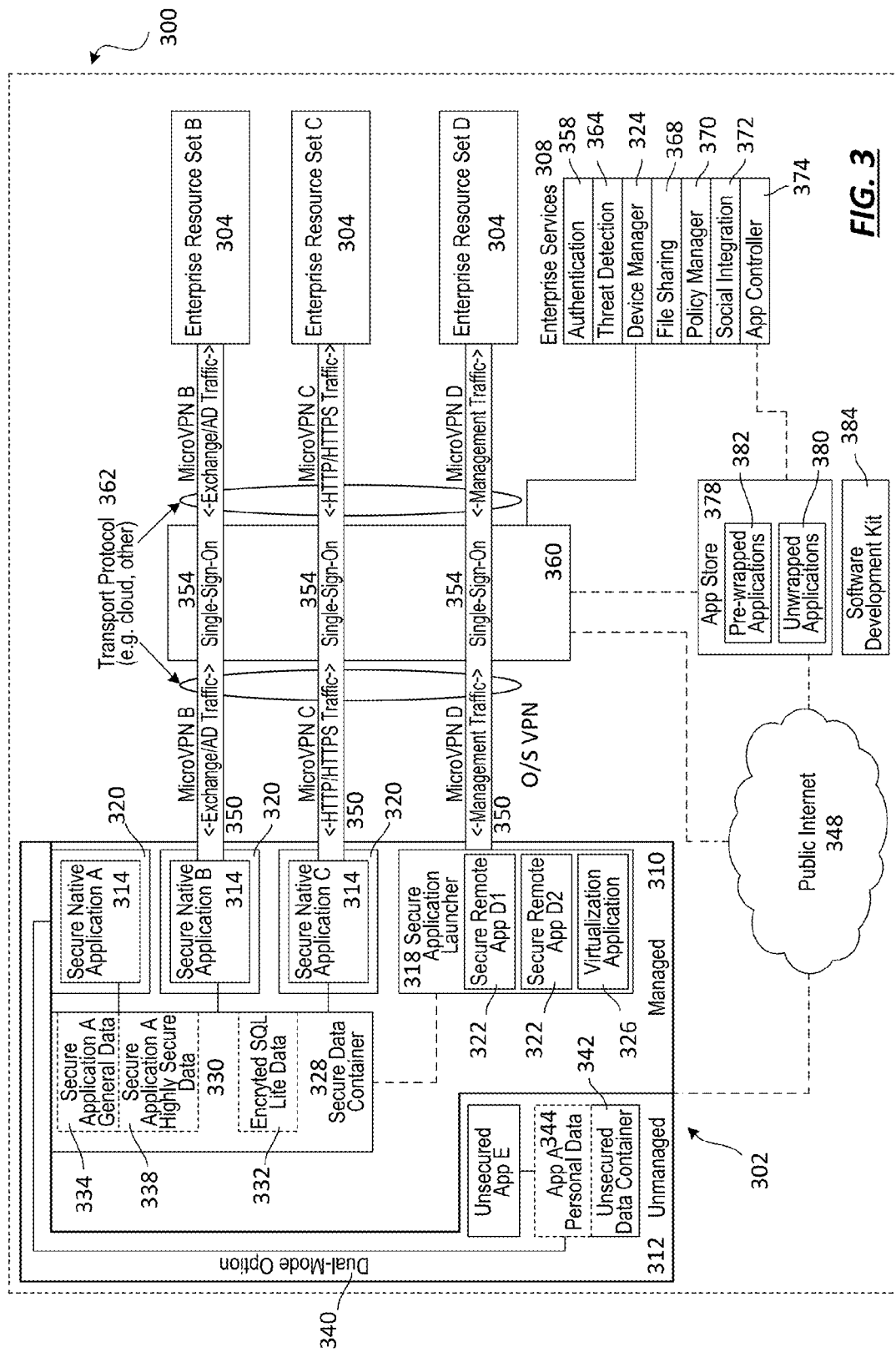
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, Hyper-Text Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like. Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 380, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
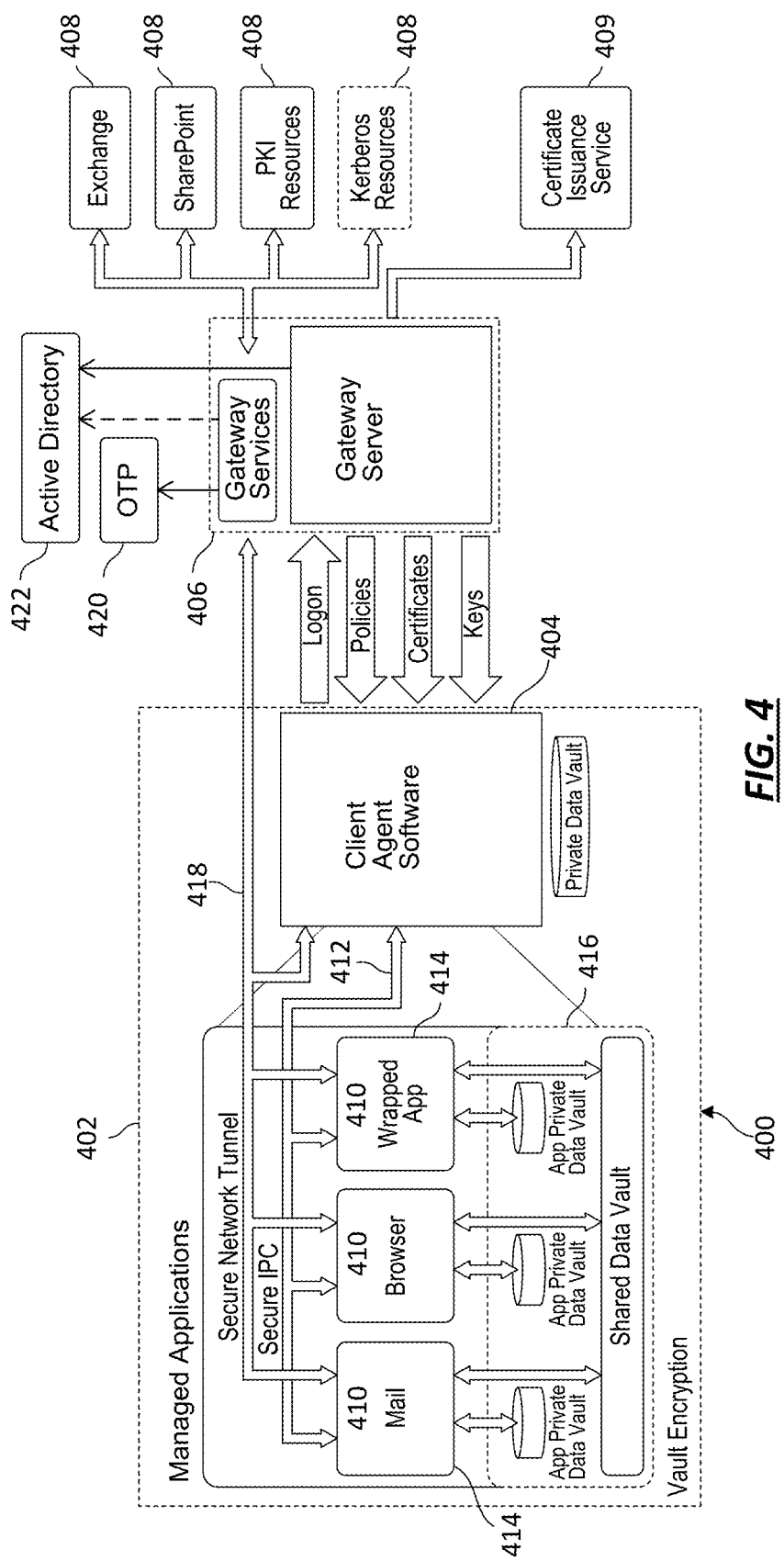
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Task Coordination and State Replication in Distributed Systems

Disclosed aspects may be directed to distributed systems. A distributed system may be a system (hardware and/or software) in which components located on networked computers communicate and coordinate their actions by passing messages from one component to another component. These networked computers may be situated in a cluster. A cluster of computers may comprise a plurality of computers or servers, and these computers or servers may be referred to as nodes. Nodes may connect to other nodes via a network. In some situations, clusters may be geographically distributed. Such clusters may be referred to as a site. A cluster where all members run the same code and configurations may be called a farm.

According to some aspects, a cluster may be setup to allow some nodes to perform specialized roles. For example, a node may be declared a master node when that node becomes the registrar and/or controller of the cluster. Other nodes may be identified as slave (e.g., non-master) nodes. These slave nodes may coordinate with the master node to perform various tasks. According to some aspects, clusters may have more than one specialized or master node.

Figure 5:
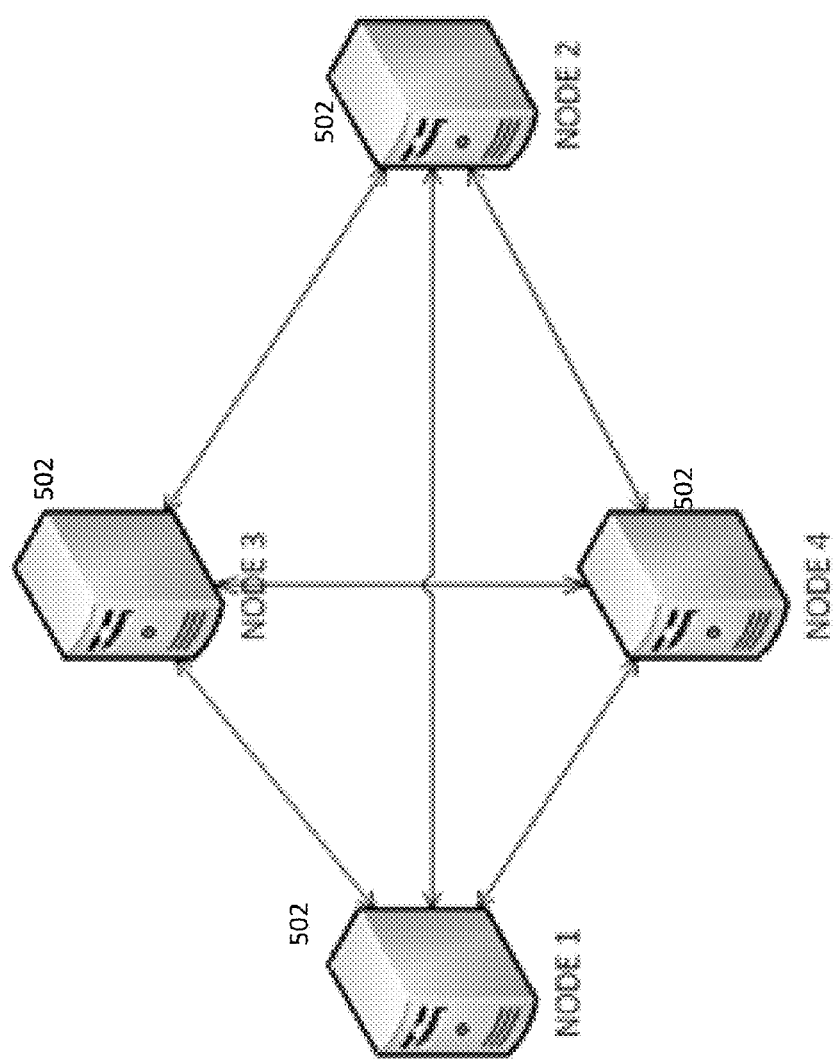
FIG. 5 depicts an illustrative diagram showing an example system in accordance with one or more features described herein.

FIG. 5 is an illustrative system 500 that may implement one or more features described herein. System 500 may show a traditional approach to clustering, where each node 502 may communicate (e.g., send messages) with another node 502 in a peer-to-peer manner. Each node 502 may be a computing device and may be similar to or may be any of the components described in FIGS. 1-4.

According to some aspects, a node 502 may execute one or more applications that may use User Datagram Protocol (UDP) and/or Transport Control Protocol (TCP) for task coordination and state replication. These applications may use a communication broker between publishers and subscribers. However, traditional approaches to clustering may be associated with one or more of the following:

1. UPD/TCP chattiness: Because each node may replicate its state to other nodes, adding a new node may have exponential network overhead.
2. Not cloud friendly: Public clouds systems like AMAZON might not allow UPD multicast within their environment. Hence, clusters developed using these traditional technologies might not be able to be deployed in these public clouds.
3. No multi-site support: UDP multicasting might not work with geographically distributed sites.
4. High administrative overheads: Traditional deployments may require dedicated administrators (e.g., people) skilled in network and server operations.
5. Large overhead: Traditional deployments might not be able to manage large amounts of devices (e.g., thousands, millions, etc.) connected to their networks because of the overhead of such protocols. Accordingly, such traditional systems may need to be highly stateless.

Figure 6:
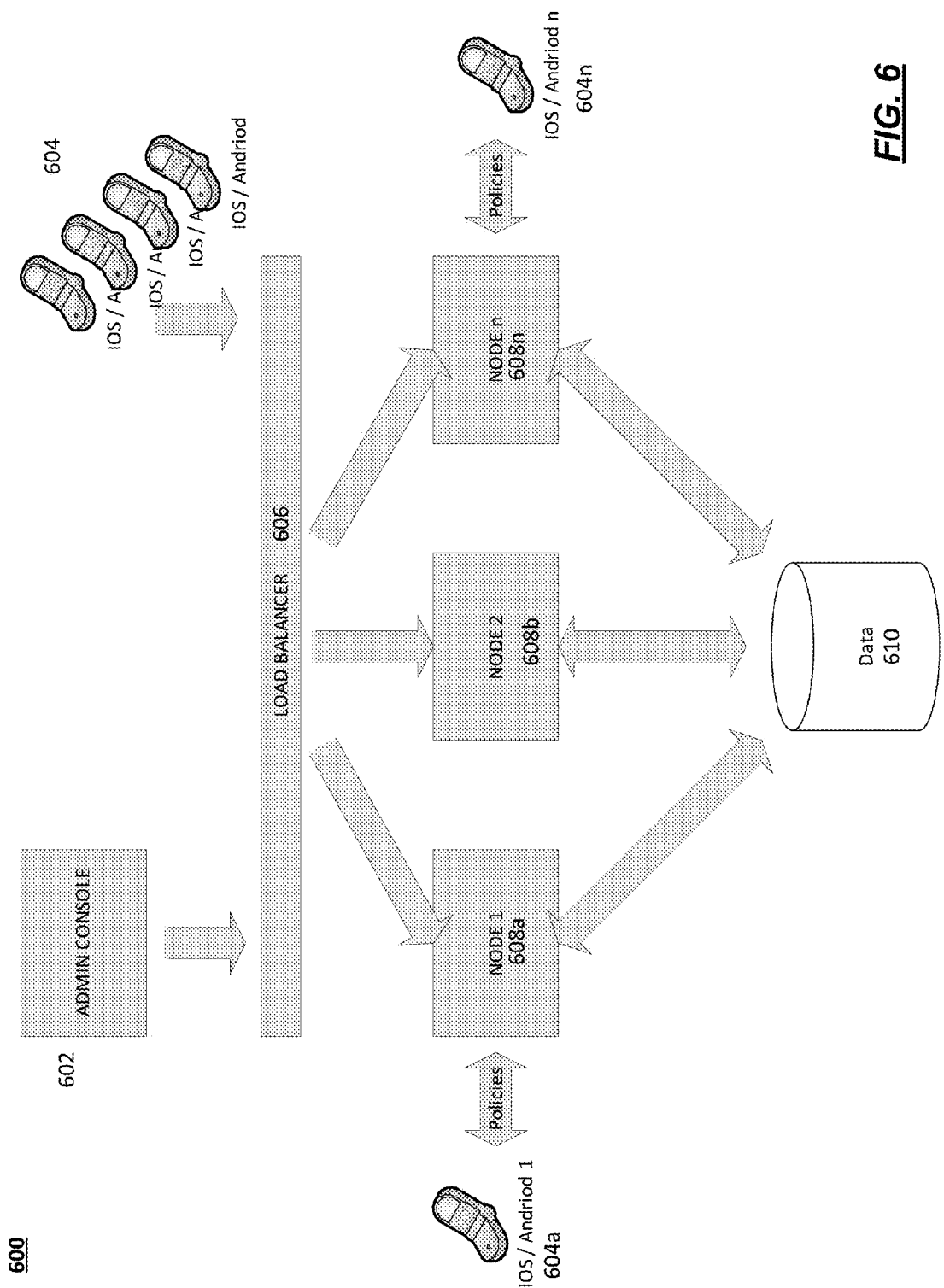
FIG. 6 depicts an illustrative diagram showing an example system in accordance with one or more features described herein.

FIG. 6 illustrates an example system 600 that may implement one or more features described herein. Disclosed aspects (e.g., associated with system 600) may be referred to as the framework. System 600 may be an illustration of the disclosed framework's architecture according to various aspects described herein. Each component of system 600 may be similar to or may be one or more of the components described in FIGS. 1-4. System 600 may include one or more administrator consoles 602, one or more client devices 604, one or more load balancers 606, one or more nodes 608, and one or more databases 610.

As shown in FIG. 6 (and also in in FIG. 7 discussed below), the nodes 608 may form a cluster of nodes. According to some aspects, each node 608 of the cluster may communicate with one or more common databases 610. Each node 608 may also communicate with one or more client devices 604 (e.g., mobile devices) that may execute various operation systems. Client devices 604 may also communicate with a load balancer 606 that may balance or otherwise coordinate tasks between the nodes 608 (this will be described below in more detail). An administrative console 602 may also provide input into the load balancer 606 that may aid in the coordination and/or balancing of tasks. In some embodiments, disclosed aspects of system 600 may allow for expansion overhead to be less than Log (n), where "n" is the number of nodes 608 to be added, as compared with traditional approaches, which result may in exponential expansion overhead. Disclosed aspects of system 600 may include a unique set of classes, services, and database tables, which may work to provide cluster related services, such as heartbeat, task coordination, health monitoring, recovery, and internode state replication. According to some aspects, nodes 608 may replicate their device state (e.g., active, inactive, dead, new, not connected, age, etc.) and may communicate this state with other nodes in that cluster, such as described herein.

Some aspects of the disclosure may be implemented as a framework (e.g., system 600) to allow a server application, such as Mobile Device Management (MDM) server, Xen-Mobile Device or Application Manager (XDM) server, and/or Enterprise Mobility Manager (XMM) server, to scale linearly without, for example, incurring overhead of UDP multicasting. System 600 may be deployable/compatible with public cloud systems.

Various aspects of the disclosure may be used in various situations and/or circumstances. For instance, various aspects of the disclosure may be used in the following cases:
1. Device enrollment.
2. Device security commands issued from a first node and device connected to a second node.
3. Device deployment.
4. Device heartbeat check-in.
5. Device Security commands issued from a first node for various operation system platforms (e.g., WINDOWS, UNIX, LINUX, iOS, ANDROID, SYMBIAN, etc.) connected to the first node.
6. Device Security commands issued from a first node to a disconnected device.
7. Background synchronization of Rule engine and packages for already connected devices.
8. Real-time synchronization of Rule engine and packages for newly connected devices.
9. Node heartbeat and cluster health monitoring.
10. Disaster recovery testing by shutting down nodes randomly, in a predetermined fashion, periodic fashion, systematic fashion, etc.
11. SQL Script for supported databases.
12. Database upgrade script for supported databases.

Some aspects may provide cluster wide health monitoring, task coordination, and communication for various servers. According to some aspects, each node in a cluster may execute the same code base and have same configurations. As the cluster load increases, a new node may be added/introduced/activated into the cluster by cloning an existing node in the cluster. This approach may eliminate a state management overhead which may be incurred by traditional frameworks. Using the disclosed framework, a server command, such as a MDM command, can be issued from any node and can be executed by another node in real-time.

According to some aspects, devices 604 (e.g., mobile and non-mobile devices) may be able to connect to any node 608 in a cluster. An administrative console 602 may be serviced from/by any node 608. Connected devices 604 may be serviced periodically through background synchronization. Connected devices 604 may be serviced immediately (e.g., with security commands) without waiting for background synchronization. Nodes 608 may store node state information in a database 610 that may be associated with the cluster. Any node 608 may become master node to resolve any conflicts and to coordinate tasks. According to some aspects, newly added nodes 608 or offline nodes 608 may read/access/receive/send messages before or after they are activated in the cluster. The load balancer 606 may employ a sticky session for device enrollments so that a device 604 can complete its enrollment at one node 608. In some embodiments, administrative consoles 602 and/or device sessions might not be replicated across the nodes 608.

Figure 7:
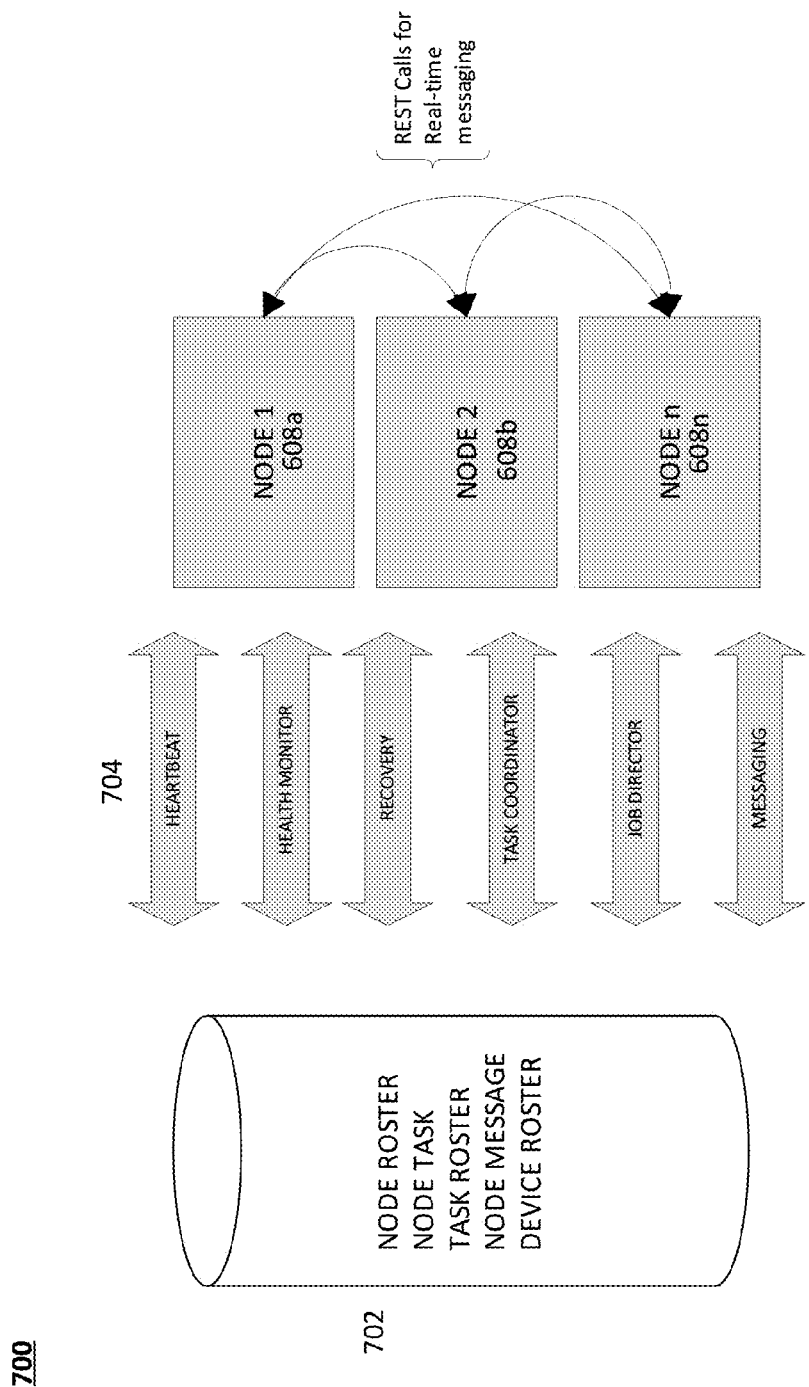
FIG. 7 depicts an illustrative diagram showing an example system in accordance with one or more features described herein.

FIG. 7 illustrates an example functional system arrangement 700 of system 600 according to various aspects described herein. Each component of system 700 may be similar to or may be one or more of the components described in FIGS. 1-4. System 700 may include one or more databases 702, one or more modules 704, and one or more nodes 608. The modules 704 may include one or more services, such as a heartbeat monitor, a health monitor, a task coordinator service, a messaging service, a recovery and cleanup service, and a job director. These services may be provided to the nodes 608 via the database 702 (this will be described below in more detail). One or more of these services (and others not explicitly described) may be implemented with and/or combined with any other module or service.

Disclosed embodiments may include database tables and classes that may work together to coordinate distributed tasks across a cluster and can safeguard such tasks from unfavorable aspects, such as race conditions, deadlocks, and starvations. A light weight messaging layer (e.g., Representational State Transfer (REST) messaging as shown in FIG. 7) may ensure that nodes 608 are in synch with each other's state without overloading the network with, for example, UDP traffic. According to some aspects, deserter recovery may be implemented by having the nodes communicate through a database. Deserter recovery may include a process of finding an inactive node 608, and taking steps to recover tasks, functions, etc. performed/implemented by that node 608. This aspect is further described herein with respect to the recovery and cleanup service.

According to some aspects, there may be little to no additional administrative cost required to add an additional node in the disclosed framework. For example, after a first node in a cluster is setup, any new nodes may be added by cloning the first one. Also, after a node goes offline, the framework may then reassign the offline node's task(s) to the other node(s) in the cluster. The disclosed framework may also allow for distributed task coordination between nodes and email like messaging/communication between nodes.

The disclosed framework may provide a light weight service that may run on some or every node in a cluster and record node heartbeats in, for example, a database table. In the disclosed framework, a background task on one or more of the nodes may then periodically read the database table to determine whether any one of the nodes still has its heartbeat. In some embodiments, a node may be declared dead if it misses a predetermined number of heartbeats. For example, if a node misses three heartbeats, that node may be declared dead. Once a node is declared dead, a recovery process may begin and may assign the dead node's tasks to other nodes in the cluster.

The disclosed framework may allow for coordination of one or more tasks across the different nodes in the cluster. In this respect, tasks may be executed/implemented on one or more nodes at a time. For example, if a task is identified as a "singleton" task, then that task may be executed on one node at a time. Performance may be measured by determining a total number of devices the cluster can support in parallel for enrollments, MDM operations, and deployments. Performance may also be measured by the time consumed for processing background tasks, such as sending notification to one or more devices and/or generating reports for large scale deployments.

With respect to the Recovery and Cleanup module illustrated in FIG. 7, as part of the Health Monitoring service, recovery modules may migrate tasks from an inactive node to a healthy node. For example, "com.citrix.cluster.task.RecoveryTask" may periodically query a "NODE ROSTER" table (as described below with respect to FIG. 8) to determine inactive nodes. If it finds an inactive node, then it may start one or more recovery tasks (which may be predefined). The following are some examples of recovery tasks:
com.citrix.cluster.task.DeviceActionRecoveryTask.
com.citrix.cluster.task.PushStateRecoveryTask.
com.citrix.cluster.task.CleanupStaleTasks.
com.citrix.cluster.task.CleanupObseleteMessages.

The disclosed framework may include a messaging service between nodes. This messaging service may be similar to e-mail and may allow nodes to receive and store state information of other nodes. For example, a first node in a particular state may send a message to a second node indicating the particular state of the first node. The second node may then store the state information of the first node. Nodes may send private messages, such as a message sent to only one or a few nodes in the cluster. Nodes may also send public messages, such as a message sent to all nodes in the cluster. In some embodiments, a receiver node may verify a sender node's identify in a node roster table (as shown in FIG. 8). In other embodiments, a certificate based authentication may be employed by verifying both self-signed and public side certificates. The certificate based authentication may be employed when, for example, each node has the same root and SSL certificate root.

With respect to the heartbeat and health monitoring service(s), each node may run a background task for implementing these services. An example of a background task may be "com.citrix.cluster.task.NodeHeartbeatTask". This task may update a node roster, which may be a database table that may register a node's presence in the cluster. FIG. 8 illustrates an example node roster table 800. With respect to health monitoring, a background task may periodically read the node roster table 800. This background task may mark a node as "inactive" if it finds a node with an expired value in the "NEXT_CHECKIN" column. An example of this background task may be "com.citrix.cluster.task.ClusterHealthMonitorTask". Once a node is marked as inactive, the framework may then execute the recovery module, so that any tasks assigned to the inactive mode can be transferred to a healthy/active node in the cluster. In some embodiments, the oldest node is selected as the surrogate node (e.g., the node that receives tasks from an inactive node). In other embodiments, the selection of the surrogate node may be optimized according to system resources, constraints, other factors, etc.

With respect to the task coordinator service, this service may provide ways to coordinate and execute task(s) across the cluster. In some embodiments, the task coordinator service may use database tables, such as Node Task table 900, shown in FIG. 9, and Node Task Roster table 1000, shown in FIG. 10, and an interaction of java classes, as further explained with respect to Task Coordination and Task Execution discussed herein. The task coordinator service/task manager may use these artifacts to prevent cluster wide race conditions, starvations, and deadlocks. A task execute process may then ask permission to execute a task on a given node. The framework may issue a lock based on the existing conditions of the node and/or the configurations provided in Node Task table.

FIG. 9 illustrates an example Node Task table 900. The following are example descriptions of the Node Task table 900:
1. "NODE_TASK" (aka Task Definition) table may maintain design/static information about a task. Before issuing a lock, Task Manager may ensure that each task has a unique row in this table.
2. If "SINGLETON" column is set to true, then framework may ensure that, in some embodiments, only one node can execute a task cluster wide.
3. If "BATCH_SIZE" is defined, then execution of the task may be limited to the batch only. For example, APNS notification task can be defined as SINGLETON with BATCH_SIZE of 100. Node 1 may execute this task and send notifications to 100 devices. If Node 1 gets busy, then Node 2 (or another node in the cluster) may execute this task for the same 100 devices or a different combination of devices (e.g., another 100 devices that may include some or all of the original 100 devices). Each node executing the batch may maintain a starting value for the next batch in the RESTRICTION column.
4. The "RESTRICTION" column may store any restrictions associated with the task. For example:
   a. Resource Policy Restriction: Enforcement of a resource policy that may ensure the system is in a healthy state and has enough resources to run the task.
   b. Data Set Restriction: If a data restriction policy is defined, then the task may limit its operation to the defined set.

The following examples may be used to implement features described herein.

Resource Policy Example:

```
{
    "resource_policy":
    {
        "resource":
        [ {
            "type": "cpu",
            "available": "50",
            "unit": "percentage"
        },
        {
            "type": "memory",
            "available": "50",
            "unit": "percentage"
        },
        {
            "type": "disk",
            "available": "500",
            "unit": "GB"
        },
        {
            "type": "thread",
            "active": "5000"
        } ] }}
```

Data Set Example:

```
{
    "data_set": {
        "devices": {
            "id": [
                "20",
                "45",
                "5"
            ] }}}
```

FIG. 10 illustrates an example Node Task Roster table 1000. The Node Rask Roster table 1000 may store runtime information about tasks. The task manager may create and maintain a unique row for each task of the node. This data may help the framework coordinate tasks across the cluster.

The task manager may use a process/algorithm to issue locks that may be cluster wide safe from race condition, deadlocks, and starvations. The task manager may have the authority to break deadlocks and cleanup stale tasks. In some embodiments, if the "NEXT_RUN" column has a value, then the framework may ensure that the task might not start before the value provided in that column. In some embodiments, the tasks can be grouped and can be executed in sequence by defining the values of "GROUP_ID" and "SEQUENCE". The framework may then, according to some aspects, ensure that the execution order is maintained.

Referring back to FIG. 4, with respect to the job director service, a job may be a task that may be, for example, created by an administrator to do application level work (e.g. report generation). It may be the responsibility of job director to successfully execute such jobs. In some embodiments, the role of the job director may be different than the Task Manager. In some aspects, the Task Manager's scope may be system wide, while the job director may be a type of task executor for administrative type jobs.

Figure 11:
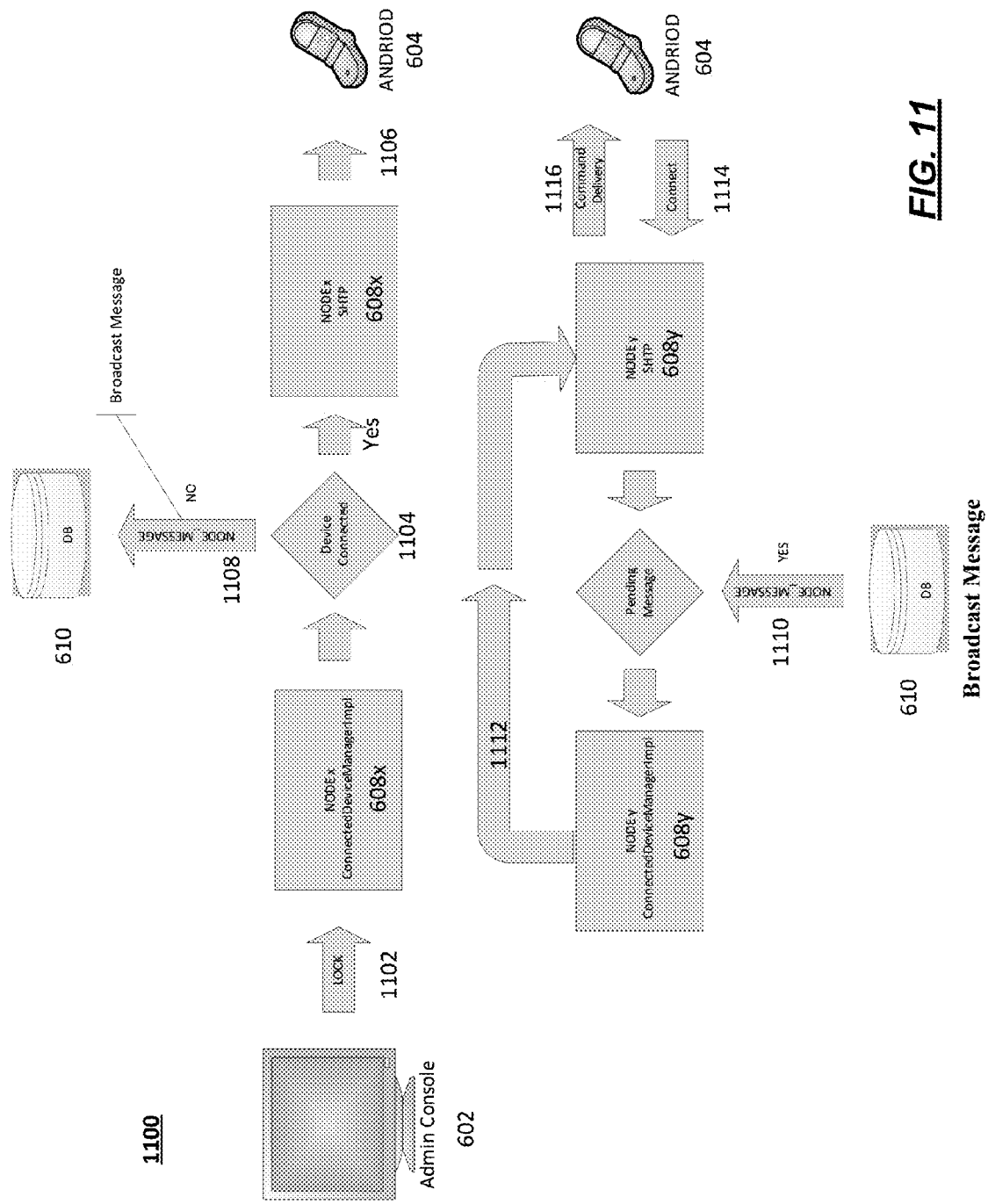
FIG. 11 depicts an illustrative diagram showing an example flow process in accordance with one or more features described herein.
Figure 12:
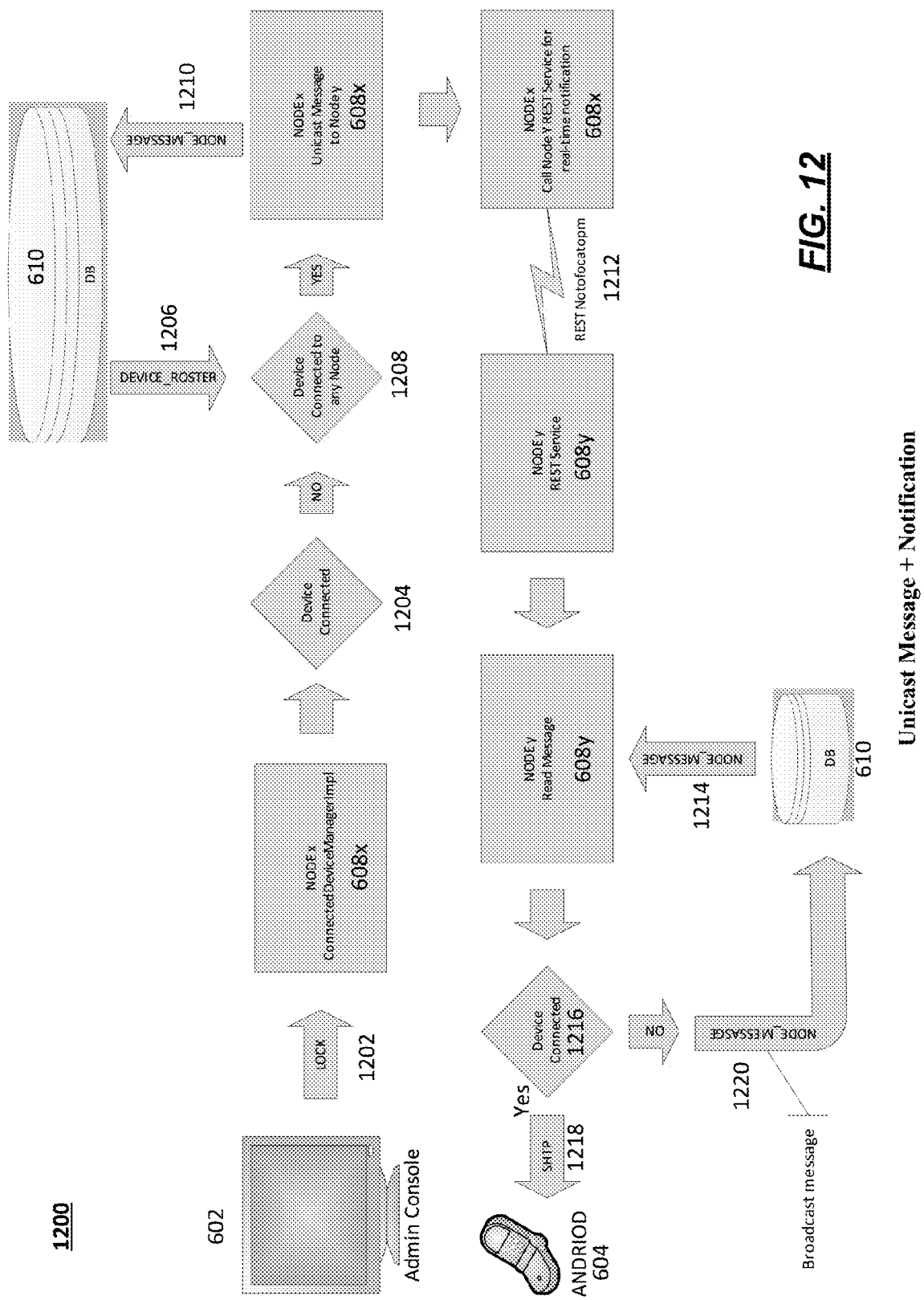
FIG. 12 depicts an illustrative diagram showing an example flow process in accordance with one or more features described herein.

With respect to the messaging service, as shown in FIG. 7, the framework may facilitate sending messages from one node 608 to other node 608. According to some aspects, messages may be delivered via one or more databases 610. The framework may support various types of messages according to features described herein. FIGS. 11 and 12 illustrate example flow processes of messaging in accordance with one or more features described herein. The following describe three examples of messages (as well as other types not explicitly described herein) that may be supported by the framework.

1. Unicast message (e.g., from node A to node B). This type of message can be used to deliver a security command to another node when the device is connected. The framework may read the target node's information from the Device Roster table. If the receiving node cannot fulfill or does not understand the message, then the receiving node may convert it to a broadcast message (see, e.g., Unicast Message+Notification as shown in system 1200 shown in FIG. 12).
2. Broadcast message (e.g., from node A to any node(s) that have a device attached or has interest in the message). For a broadcast message, the "TO" field may remain empty. For example, SHTP (Secure Hypertext Transfer Protocol) messages for Android devices may be sent as broadcast messages. An example of a broadcasted message can be seen in system 1100 shown in FIG. 11. It is noted that while Android is illustrated in FIGS. 11 and 12, any described aspect may be implemented on any other operating system. The node(s) that have a live/current session with the device may then consume this message (see, e.g., Unicast Message+Notification as shown in FIG. 12).
3. Multicast message (e.g., from node A to all (or some) active nodes). If a message is marked as a multicast message, then the framework may create multiple copies of the message. In this sense, the framework may create a copy of the message for each node. For example, any deployment engine changes may be sent as multicast messages and may dictate that all nodes update accordingly.

FIG. 11 illustrates an example flow process 1100 in accordance with one or more aspects described herein. Process 1100 may be performed by a computing device, such as the any device described herein, such as the system 600. In one or more embodiments, the process 1100 illustrated in FIG. 11 and/or one or more steps thereof may be performed by any device or component of FIGS. 1-7. In other embodiments, the process illustrated in FIG. 11 and/or one or more steps thereof may be embodied in computer-executable instructions that are stored in a computer-readable medium, such as a non-transitory computer-readable memory. The steps in this flow process 1100 need not all be performed in the order specified and some steps may be omitted and/or changed in order.

The process 1100 may begin at step 1102, where an administrator console 602 may issue a command for implementation or execution on one or more client devices 604. As illustrated in FIG. 11, the command may be a lock command. However, the admin console 602 may issue any other command, such as WIPE, Refresh UI, deploy policy or program, deploy all policies or program, etc. The admin console 602 may send this command to a first node 608x, which may be in the cluster of nodes. According to some aspects, the node 608x may use a connected device manager implementation to receive or process the message At step 1104, the node 608x may determine its device state (e.g., whether the node 608x is connected to or active in the cluster) and whether an intended recipient client device 604 is connected to the node 608x. If the client device 604 is connected to the node 608x, then the process may continue to step 1106. At step 1106, the node 608x may send the command to a connected client device 604. For example, the node 608x may send the command via HTTP, HTTPS, Secure Hypertext Transfer Protocol (SHTP), and the like.

If, at step 1104, the node 608x determines that the client device 604 is not connected to the node 608x, then the process may proceed to step 1108, where the node 608x may send a message to a database 610. According to some aspects, the message may be a broadcast message, such as described above. The message may be a Node Message and may be formatted or stored as a database table, such as the "NODE_MESSAGE" table 1300 example illustrated in FIG. 13. With respect to FIG. 13, "REFERENCE", "REF_TYPE", "TOPIC", and "TOPIC_GROUP" columns may store information that may categorize messages for rapid retrieval. For example, the Deployment Engine messages' "REFERENCE" column may contain a PackageID. For an Android MDM message, this column may contain a device serial number. Similarly, REF_TYPE may store "PACKAGE_ID" and "DEVICE_SERIAL", respectively. A subscriber Topic may list a topic. Topics may be defined in, for example, "com.citrix.cluster.om.MessageTopic" enum. Each topic may belong to a group (Topic_Group). The subscriber (e.g., background task) can subscribe to one or more topics or to one or more group of topics. TOPIC and TOPIC_GROUP may facilitate publishing and subscribing to a message or a message type. It is noted that commands (cmd) may be split into groups, such as security commands and MDM commands.

The following are examples of available topics:
deploy_engine,
deploy_engine_reset,
deploy_engine_add_pkg,
deploy_engine_update_pkg,
deploy_engine_remove_pkg,
security_cmd,
cmd_wipe_device,
cmd_container_unlock,
cmd_container_lock,
cmd_unlock_device,
cmd_lock_device,
cmd_sdcard_wipe_device,
cmd_corp_wipe_device, cmd_disconnect_device,
cmd_deploy_device,
cmd_uninstall_app,
cmd_install_app,
cmd_device_pwd_reset,
cmd_locate_device The "STATUS" column may contain any value from, for example, "com.citrix.cluster.om.MessageStatus" enum. For example, enums may include: NEW, READ, ERROR, IGNORED, DELETED, etc.

According to some aspects, for any message that is marked as "HIGH PRIORITY" and has a valid receiver name (e.g., a particular node) in TO field, the framework may notify the receiving node via, for example, a REST (Representational State Transfer) call or message (see, e.g., Unicast Message+Notification as shown in FIG. 12).

Referring back to FIG. 11, the process 1100 may continue at step 1110, where the database 610 may send the node message to a node 608y. At step 1112, the node 608y may process or access the message and any commands associated therewith. According to some aspects, the node 608y may use a connected device manager implementation to receive or process the message. At step 1114, the node 608y may connect to the intended recipient client device 604. According to some aspects, the database 610 may send the message at step 1110 do a node that may already be connected to the client device 604. At step 1116, the node 608y may then transmit the command to the client device 604 (e.g., via HTTP, HTTPS, SHTP, etc.). The process 1100 may end after any step.

FIG. 12 illustrates an example flow process 1200 in accordance with one or more aspects described herein. Process 1200 may be performed by a computing device, such as the any device described herein, such as the system 600. In one or more embodiments, the process 1200 illustrated in FIG. 12 and/or one or more steps thereof may be performed by any device or component of FIGS. 1-7. In other embodiments, the process illustrated in FIG. 12 and/or one or more steps thereof may be embodied in computer-executable instructions that are stored in a computer-readable medium, such as a non-transitory computer-readable memory. The steps in this flow process 1200 need not all be performed in the order specified and some steps may be omitted and/or changed in order.

The process 1200 may begin at step 1202, where an administrator console 602 may issue a command for implementation or execution on one or more client devices 604. As illustrated in FIG. 12, the command may be a lock command. However, the admin console 602 may issue any other command, such as WIPE, Refresh UI, deploy policy or program, deploy all policies or program, etc. The admin console 602 may send this command to a first node 608x, which may be in the cluster of nodes. According to some aspects, the node 608x may use a connected device manager implementation to receive or process the message.

At step 1204, the node 608x (or other component) may determine whether the intended recipient client device 604 may be connected to the node 608x. If the client device 604 is not connected to the node 608x, then, at step 1206, the database 610 may transmit to the node 608x a message that may include a device roster, such as shown in FIG. 14. FIG. 14 illustrates an example of a device roster table 1400. The device roster table may facilitate sending "Unicast" and "Instant" messages to a node having a live/current session with a device.

Referring back to FIG. 12, at step 1208, the node 608x (or other component) may determine whether the intended recipient client device 604 may be connected to any node in the cluster (e.g., based on the information in the device roster). If the client device 604 is connected to a node in the cluster, then at step 1210, the node 608x may send a node message to the database 610. According to some aspects, the message may be a unicast message, such as described above. The message may be formatted or stored as a database table, such as the "NODE_MESSAGE" table 1300 example illustrated in FIG. 13. The intended recipient of this message may be a node 608y that may be or might not be connected to the client device 604.

At step 1212, the node 608x may then send a message to the connected node 608y. According to some aspects, this message may be a REST (Representational State Transfer) message or call. According to some aspects, with respect to messaging, a node can send a real-time instant message to another node via a REST message. Thus, at step 1210, the message may be saved into the database 610. Then, at step 1212, the sending node 608x may notify the receiving node 608y via an asynchronous REST call. According to some aspects, if the receiving node 608y might not understand the message or might not be able to fulfill the requests in the message, then receiving node 608y may convert this message into a Broadcast message (as shown in FIG. 11). Message cleanup tasks may run periodically to delete stale messages. In some embodiments, the framework may provide a REST service for Ping and Echo operations so that nodes can find out the status of other nodes in real-time.

At step 1214, after the node 608y has received the REST call from the node 608x, then the process may proceed to step 1214, where the node 608y may receive the node message transmitted to the database 610 at step 1210 from the database 610. According to some aspects, the node 608y may have knowledge of this node message or may know to request or look for this node message because of the REST call made at step 1212 (e.g., the node 608x may notify node 608y that there may be a node message in database 610 that may be intended for the node 608y).

At step 1216, the node 608y (or other component) may determine whether the client device 604 may be connected to the node 608y. If, at step 1216, it is determined that the client device 604 may be connected to the node 608y, then at step 1218, the node 608y may send the command to the client device 604 (e.g., via HTTP, HTTPS, SHTP, etc.). If, at step 1216, it is determined that the client device 604 might not be connected to the node 608y, then the process may continue to step 1220. At step 1220, the node 608y may send a node message to the database 610. This node message may be a broadcast message that may be directed to all of the nodes in the cluster. Then, the database 610 may send the node message to another node in the cluster (such as described in FIG. 11). The process 1200 may end after any step.

According to some aspects, a client device 604 may execute iOS operating system. In such cases, a node 608 may use a push notification service to communicate with the client device 604. For example, the admin console 602 may send to a node 608 a security command (e.g., WIPE, Refresh UI, deploy, deploy all, etc.) to be implemented on the client device 604. Thus, in some cases, the node 608 may use the push notification service to send the command to the client device 604.

According to some aspects, an older node (e.g., oldest node in the cluster) may push to the database 610 its state and the command received from the admin console 602. In such a case, the database 610 may then push the older node 608's state and the command to other nodes 608 in the cluster. Then, these other nodes 608 may send information (e.g., policies, commands, etc.) to connected client devices 604.

As illustrated in the discussion above, various aspects described herein may be embodied in various forms. For instance, various aspects may be embodied in a method, in a computing device, in computer-executable instructions stored in a computer-readable medium, and/or in an apparatus.

In other examples, various aspects may be embodied in a computing device that includes at least one processor and memory storing computer-readable instructions that, when executed by the at least one processor, cause the computing device to perform any and/or all of the descriptions, steps, processes, and/or methods discussed herein. In still other examples, various aspects of the disclosure may be embodied in one or more computer-readable media (which may, e.g., include a non-transitory computer-readable memory) storing instructions that, when executed by at least one processor, cause the at least one processor to perform any and/or all of the descriptions, steps, processes, and/or methods discussed herein. In yet other examples, various aspects of the disclosure may be embodied in an apparatus comprising one or more means for performing any and/or all of the descriptions, steps, processes, and/or methods discussed herein.

What is claimed is:

1. A method comprising:
    receiving, by a first computing device of a cluster of computing devices, a command for a client device;
    determining, by the first computing device and based on receiving the command, whether the first computing device of the cluster is connected to the client device;
    transmitting, from the first computing device and in response to determining that the first computing device is not connected to the client device, a first message to a database associated with the cluster, the first message comprising the command and a device state of the first computing device;
    determining, by the first computing device and based on a roster received from the database, a connection status for the client device;
    transmitting, from the first computing device and to a second computing device of the cluster, based on the roster, an indication of the first message to the second computing device;
    transmitting, from the database and based on receiving a request for the first message from the second computing device, a second message to the second computing device, the second message comprising the command and the device state of the first computing device; and
    transmitting, from the second computing device and based on receiving the second message, the command to the client device.

2. The method of claim 1, wherein the command comprises an instruction for one or more client devices, wherein the client device is of the one or more client devices, and wherein the first message comprises a broadcast message, the method further comprising:
    transmitting, from the database, the second message to one or more other computing devices of the cluster connected to the one or more client devices.

3. The method of claim 1, wherein the command comprises an instruction for one or more client devices, wherein the client device is of the one or more client devices, and wherein the first message comprises a multicast message, the method further comprising:
    transmitting, from the database, the second message to all of the computing devices of the cluster.

4. The method of claim 1, wherein the indication comprises a real-time notification.

5. The method of claim 1, wherein the first computing device and the second computing device are not connected to the client device, the method further comprises:
    transmitting a broadcast message to the database, the broadcast message including the command for the client device, the device state of the first computing device and the device state of the second computing device; and
    transmitting, from the database, a third message to a third computing device of the cluster connected to the client device, the third message including the command, the device state of the first computing device and the device state of the second computing device.

6. A system, comprising:
    at least one processor; and
    at least one memory storing computer-readable instructions that, when executed by the at least one processor, cause the system to perform:
    receiving, by a first computing device of a cluster of computing devices, a command for a client device;
    determining, by the first computing device and based on receiving the command, whether the first computing device of the cluster is known, by the first computing device, to be connected to the client device;
    transmitting, from the first computing device and in response to determining that the first computing device is not connected to the client device, a first message to a database associated with the cluster, the first message comprising the command and a device state of the first computing device;
    determining, by the first computing device and based on a roster received from the database, a connection status for the client device;
    transmitting, from the first computing device and to a second computing device of the cluster, based on the roster, an indication of the first message to the second computing device;
    transmitting, from the database and based on receiving a request for the first message from the second computing device, a second message to the second computing device, the second message comprising the command and the device state of the first computing device; and
    transmitting, from the second computing device and based on receiving the second message, the command to the client device.

7. The system of claim 6, wherein the command comprises an instruction for one or more client devices, wherein the client device is of the one or more client devices, wherein the first message comprises a broadcast message, and wherein the computer-readable instructions further cause the system to perform transmitting, from the database, the second message to one or more computing devices of the cluster connected to the one or more client devices.

8. The system of claim 6, wherein the command comprises an instruction for one or more client devices, wherein the client device is of the one or more client devices, wherein the first message comprises a multicast message, and wherein the computer-readable instructions further cause the system to perform transmitting, from the database, the second message to all of the computing devices of the cluster.

9. The system of claim 6, wherein the second message comprises a real-time notification from the first computing device.

10. The system of claim 6, wherein the first computing device and the second computing device are not connected to the client device, wherein the computer-readable instructions further cause the system to perform:
transmitting a broadcast message to the database, the broadcast message including the command for the client device, the device state of the first computing device and the device state of the second computing device; and
transmitting, from the database, a third message to a third computing device of the cluster connected to the client device, the third message including the command, the device state of the first computing device and the device state of the second computing device.

11. One or more non-transitory computer-readable storage media having computer-readable instructions stored thereon, that when executed by one or more processors, cause the one or more processors to perform:
receiving, by a first computing device of a cluster of computing devices, a command for a client device;
determining, by the first computing device and based on receiving the command, whether the first computing device of the cluster is connected to the client device;
transmitting, from the first computing device and in response to determining that the first computing device is not connected to the client device, a first message to a database associated with the cluster, the first message comprising the command and a device state of the first computing device;
determining, by the first computing device and based on a roster received from the database, a connection status for the client device;
transmitting, from the first computing device and to a second computing device of the cluster, based on the roster, an indication of the first message to the second computing device;
transmitting, from the database and based on receiving a request for the first message from the second computing device, a second message to the second computing device, the second message comprising the command and the device state of the first computing device; and
transmitting, from the second computing device and based on receiving the second message, the command to the client device.

12. The computer-readable storage media of claim 11, wherein the command comprises an instruction for one or more client devices, wherein the client device is of the one or more client devices, wherein the first message comprises a broadcast message, and wherein the computer-readable instructions further cause the one or more processors to perform transmitting, from the database, the second message to one or more computing devices of the cluster connected to the one or more client devices.

13. The computer-readable storage media of claim 11, wherein the command comprises an instruction for one or more client devices, wherein the client device is of the one or more client devices, wherein the first message comprises a multicast message, and wherein the computer-readable instructions further cause the one or more processors to perform transmitting, from the database, the second message to all of the computing devices of the cluster.

14. The computer-readable storage media of claim 11, wherein the second message comprises a real-time notification.

15. The computer-readable storage media of claim 11, wherein the first computing device and the second computing device are not connected to the client device, wherein the computer-readable instructions further cause the one or more processors to perform:
transmitting a broadcast message to the database, the broadcast message including the command for the client device, the device state of the first computing device and the device state of the second computing device; and
transmitting, from the database, a third message to a third computing device of the cluster connected to the client device, the third message including the command and the device state of the first computing device and the device state of the second computing device.

16. The method of claim 1, further comprising connecting the first computing device to the client device based on the connection status.

17. The method of claim 1, further comprising transmitting an indication that the first computing device is connected to the database.

18. The system of claim 6, wherein the computer-readable instructions further cause the system to perform connecting the first computing device to the client device based on the connection status.

19. The system of claim 6, wherein the computer-readable instructions further cause the system to perform transmitting an indication that the first computing device is connected to the database.

20. The computer-readable storage media of claim 11, wherein the computer-readable instructions further cause the one or more processors to perform:
transmitting an indication that the first computing device is connected to the database; and
connecting the first computing device to the client device based on the connection status.

* * * * *